United States Patent
Schwartzman

[19]
[11] Patent Number: 6,075,858
[45] Date of Patent: Jun. 13, 2000

[54] ENCRYPTION KEY SYSTEM AND METHOD

[75] Inventor: Nikolai L. Schwartzman, Campbell, Calif.

[73] Assignee: SCM Microsystems (U.S.) Inc., Los Gatos, Calif.

[21] Appl. No.: 08/549,652

[22] Filed: Oct. 27, 1995

[51] Int. Cl.[7] .................................................. H04L 9/00
[52] U.S. Cl. ........................................... 380/4; 380/25
[58] Field of Search ............................. 380/4, 23, 25, 380/50; 395/800; 340/825.34

[56] References Cited

U.S. PATENT DOCUMENTS

| | | | |
|---|---|---|---|
| 4,429,180 | 1/1984 | Unkenholz | 380/46 |
| 4,558,176 | 12/1985 | Arnold et al. | 380/30 |
| 4,733,345 | 3/1988 | Anderson | 380/25 |
| 4,759,063 | 7/1988 | Chaum | 380/30 |
| 4,853,962 | 8/1989 | Brockman | 380/44 |
| 4,879,747 | 11/1989 | Leighton et al. | 380/23 |
| 4,897,875 | 1/1990 | Pollard et al. | 380/21 |
| 4,926,479 | 5/1990 | Goldwasser et al. | 380/23 |
| 4,995,081 | 2/1991 | Leighton et al. | 380/23 |
| 5,001,754 | 3/1991 | Deffeyes | 380/46 |
| 5,003,596 | 3/1991 | Wood | 380/28 |
| 5,113,444 | 5/1992 | Vobach | 380/47 |
| 5,159,632 | 10/1992 | Crandall | 380/28 |
| 5,159,634 | 10/1992 | Reeds, III | 380/42 |
| 5,161,244 | 11/1992 | Maurer | 380/43 |
| 5,199,074 | 3/1993 | Thor | 380/50 |
| 5,237,614 | 8/1993 | Weiss | 380/23 |
| 5,266,942 | 11/1993 | Stoller | 340/825.34 |
| 5,271,061 | 12/1993 | Crandall | 380/28 |
| 5,272,754 | 12/1993 | Boerbert | 380/25 |
| 5,276,735 | 1/1994 | Boerbert et al. | 380/21 |
| 5,293,424 | 3/1994 | Holtey et al. | 380/23 |
| 5,293,576 | 3/1994 | Mihm, Jr. et al. | 380/21 |
| 5,297,207 | 3/1994 | Degele | 380/46 |
| 5,307,410 | 4/1994 | Bennett | 380/21 |
| 5,335,280 | 8/1994 | Vobach | 380/42 |
| 5,337,362 | 8/1994 | Gormish | 380/54 |
| 5,371,794 | 12/1994 | Diffie et al. | 380/21 |
| 5,412,729 | 5/1995 | Liu | 380/37 |
| 5,442,705 | 8/1995 | Holtey | 380/23 |
| 5,473,692 | 12/1995 | Davis | 380/23 |
| 5,491,827 | 2/1996 | Holtey | 395/800 |
| 5,604,800 | 2/1997 | Johnson et al. | 380/4 |
| 5,610,980 | 3/1997 | Johnson et al. | 380/4 |
| 5,612,682 | 3/1997 | DeLuca et al. | 340/825.34 |
| 5,619,574 | 4/1997 | Johnson et al. | 380/4 |
| 5,623,637 | 4/1997 | Jones et al. | 380/23 |

*Primary Examiner*—Salvatore Cangialosi
*Attorney, Agent, or Firm*—Robert P. Sabath

[57] ABSTRACT

A method and system for secure encryption of information using a computer, including generating a key of a selected size, creating a virtual drive on a memory card, using the key generated to encrypt selected information, saving the key generated to a selected memory, creating a pointer that will read the virtual drive at the location on the memory card at which the key begins, physically removing the memory card from the encrypted information, and remotely securing the memory card.

7 Claims, 7 Drawing Sheets

ENCRYPTION KEY SYSTEM AND METHOD

TECHNICAL FIELD OF THE INVENTION

This invention relates to systems and methods for securing encryption keys on a removable memory module, and more particularly to systems and methods for securing encryption keys on a memory or Smart Card, including but not limited to a flash memory card.

BACKGROUND

Encryption methods of many kinds are well known. One such method, known as the one time pad encryption method was invented in 1917 by Major Joseph Mauborgne and AT&T's Gilbert Vernam. The one time pad is a key of random letters, written on sheets of paper bound together in a pad. The pad is used to encrypt plain text and to decrypt the encrypted ciphertext. The pad is kept secret, and can be referred to as a private key. For security, the pad has the same or more letters than the message being encrypted. Accordingly, the pad is cumbersome, because it requires a large number of letters.

For securing encrypted files in a personal computer or terminal, the key used to encrypt the plain text or information may be stored within the physical system of the personal computer or in a network to which the personal computer is connected. This is disadvantageous because the security of the key can be breached by an individual having access to the particular personal computer or to the network to which the personal computer is coupled.

SUMMARY OF THE INVENTION

According to the present invention, information is secured by generating a key of an appropriate size, creating a virtual drive on a memory card, using the key generated to encrypt selected information, saving the key generated to a selected memory, creating a pointer that will read the virtual drive at the location on the memory card at which the key begins, physically removing the memory card from the encrypted information, and remotely securing the memory card.

According to the present invention, a physically secure flash memory key storage medium is established by measuring the size of information to be encrypted, creating a key of sufficient size to ensure a desired security level, creating a virtual drive, and storing the tailored key on a flash memory medium.

BRIEF DESCRIPTION OF THE DRAWINGS

FIG. 1c is a block diagram of a flash key system according to the present invention, including a personal computer (PC) system, a PC operating system (OS), an encryption software module, a mass storage system, and a physically removable flash memory card;

FIG. 2c is a block diagram showing the relationship between a file allocation table of the operating system and a flash medium in terms of a file allocation table.

DETAILED DESCRIPTION OF THE INVENTION

Figure 1A:
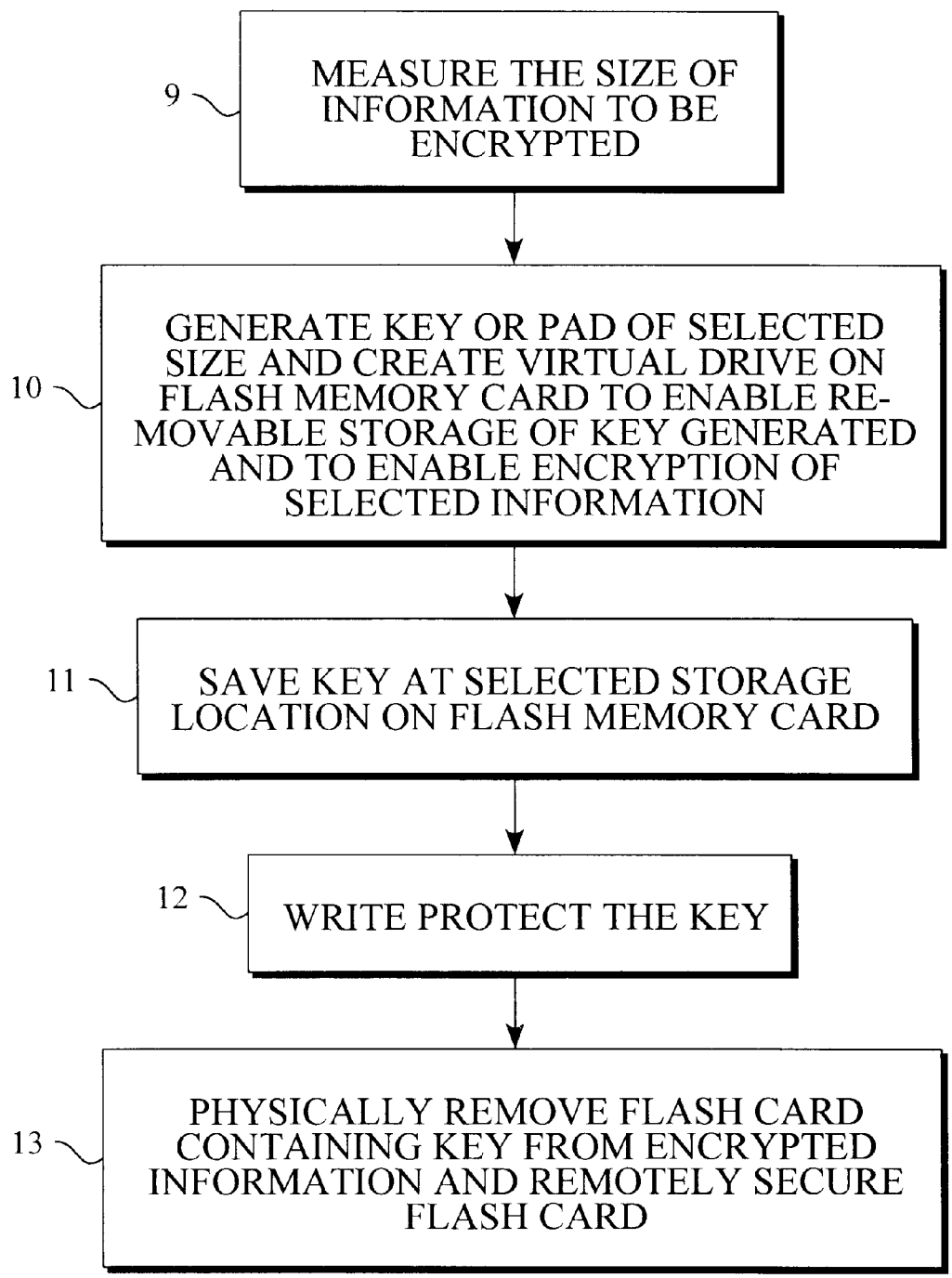
FIG. 1a is a flow chart of the method according to the present invention to secure an encryption key in a removable memory card.

FIG. 1a is a flow chart of the method according to the present invention. In particular, an embodiment of the present method includes generating 10 a key or pad of a selected size and creating a virtual drive on a flash card, and using the key generated to encrypt selected information. The method of the present invention further includes saving 11 the key generated to a selected card such as for example but not limited to a memory or Smart Card, including but not limited to a flash memory card. As is well known, Smart Cards are elongated, flat pieces of selected material, containing a memory which is externally readable and writable. A Smart Card has a predetermined thickness within which the memory is contained. A Smart Card may contain a microprocessor coupled to the memory for conducting data exchange activities with the memory. A Smart Card is typically on the order of the dimensions of a common business card or credit card. Its thickness may be somewhat greater than the thickness of the common business card. The material of the Smart Card may be plastic, for example. A Smart Card has a predetermined stiffness or flexibility, and may or may not conform to PC Card or PCMCIA card standards. The method of the present invention further includes creating 12 a pointer that will read the virtual drive at the location on the memory card at which the key begins. The method of the present invention further includes physically removing 13 the memory card from the encrypted information and remotely securing the memory card.

Figure 1B:
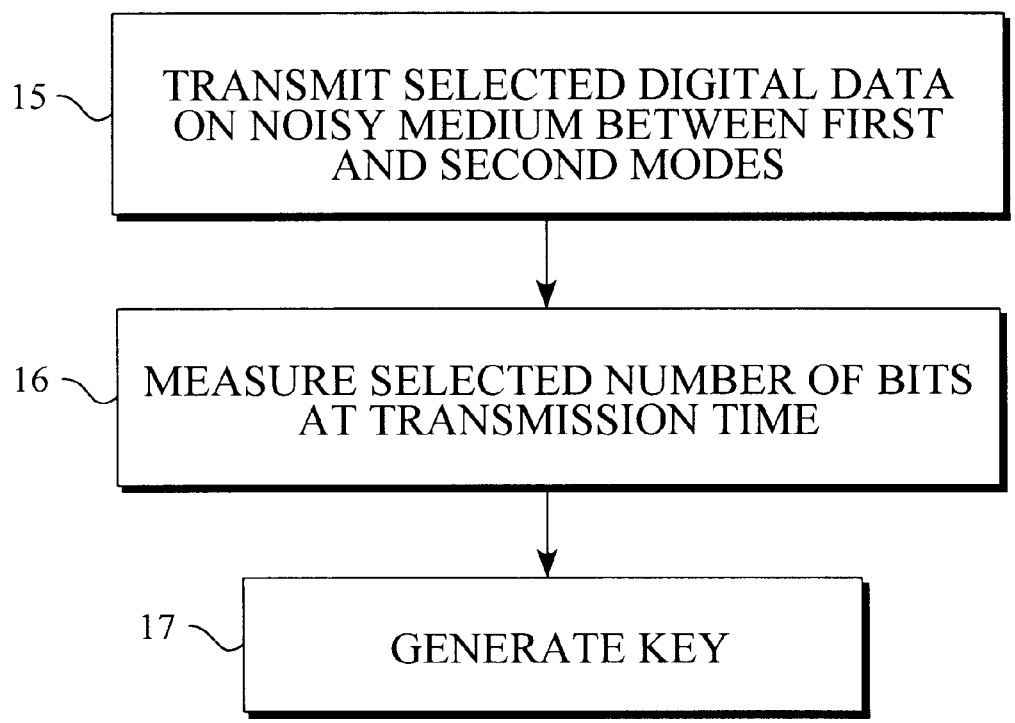
FIG. 1b is a flow chart of the method according to the present invention to generate an encryption key to be secured in a removable memory card.
Figure 16:
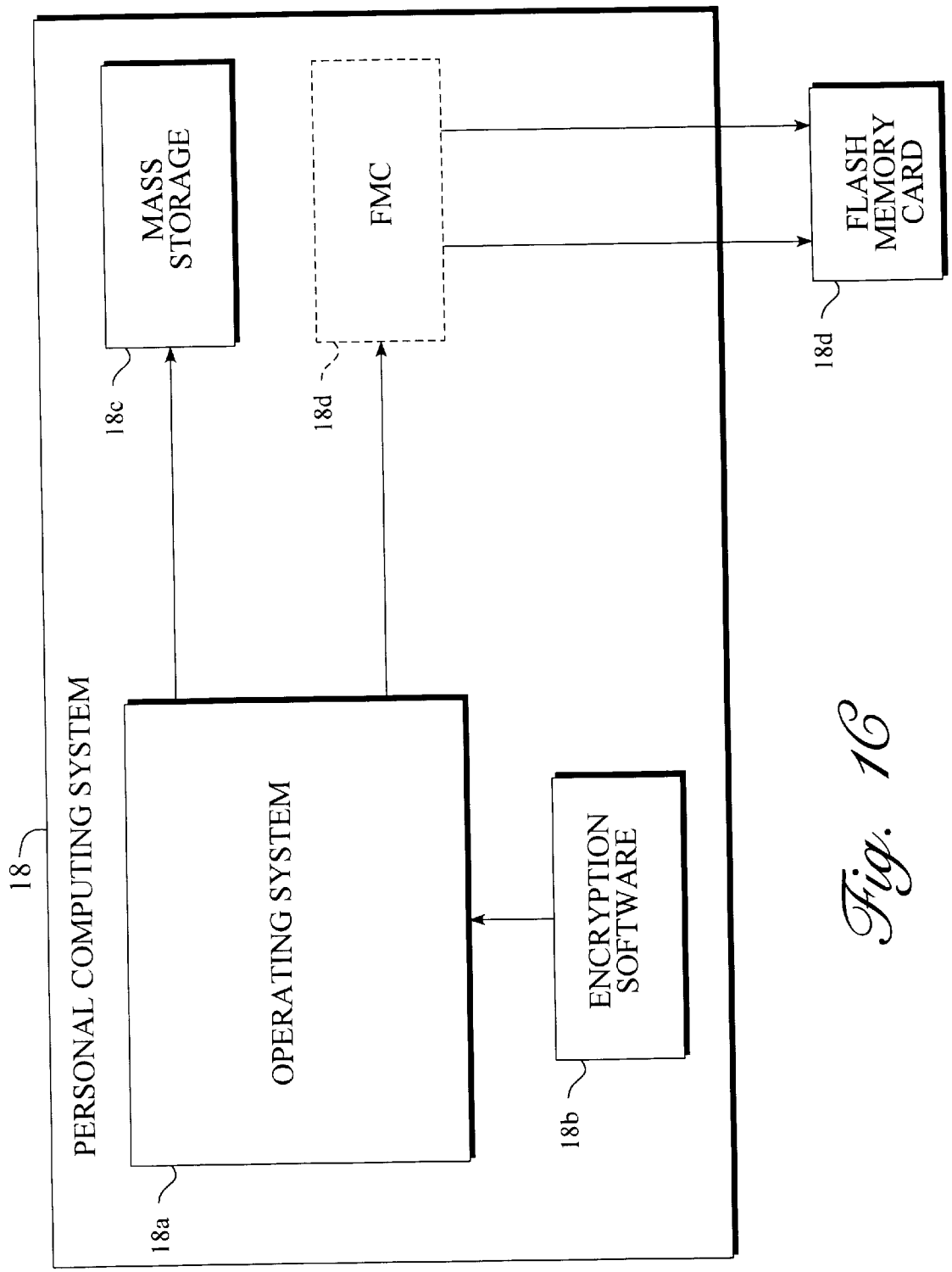

FIG. 1b is a flow chart of the method according to the present invention to generate an encryption key to be secured in a removable memory card. According to a first step of the present invention, selected digital data is transmitted 15 on a selected noisy medium between first and second nodes. Next, a selected number of bits are measured 16 for logical state, at transmission time for the movement of the selected digital data between the first and second nodes. According to a first embodiment of the present invention, the sequence of logical states of the selected number of bits constitutes the key to be used for encryption. This key is a random sequence of logical states, because the noise present on the noisy medium establishes a first level of randomness. Further, the actual transmission time at which the information is transmitted is a random time. Accordingly, the logical states are random and the time period during which these logical states are measured is random. According to this or another method, a key is generated 17.

FIG. 1c is a block diagram of an encryption key system according to the present invention, including a personal computer (PC) system 18, a PC operating system (OS) 18a, an encryption software module 18b, a mass storage system 18c, and a physically removable flash memory card 18d. According to one embodiment of the present invention, flash memory card 18d conforms to PC Card or PCMCIA standards.

PC Card and PCMCIA standards provide an expansion capability to computers including but not limited to notebook computers and personal communicators, by permitting communication between flash memory card 18*d*, for example, and a computer through a card socket fixture having a cooperative number of pins insertable into a corresponding linear array of pin-receiving apertures defined in a selected edge of the flash memory card according to one embodiment thereof.

Encryption software 18*b* can be software stored on a selected storage medium, which may be magnetic or optical for example, to implement the process of creating a key, following the process described in FIG. 1*b*. Mass storage 18*c* can be a hard drive connected within PC system 18. Encryption software 18*b* can be stored in mass storage memory 18*c*. OS 18*a* can be Windows 95, OS2, or DOS, or another operating system used for personal computers. According to one embodiment of the present invention, a key is generated and stored in a flash memory card 18*d*. The key is the used to encrypt selected plain text to produce cybertext. The resultant cybertext is stored in mass storage 18*c*. After the cybertext has been encoded, flash memory card 18*d* is removed from PC system 18. The physical separation of the key on flash memory card 18*d* from PC system 18 provides security from anyone having access to personal computer system 18.

The conventional memory organization of a flash memory card 18*d* includes erase regions which are not defined to be compatible with the file structures of conventional operating systems. Accordingly, under the present invention, a virtual organization for flash memory card 18*d* is established to make flash memory card 18 organizationally and practically compatible with operating system 18*a*, as will be discussed in detail below with reference to FIGS. 2*b* and 2*c*.

Figure 2A:
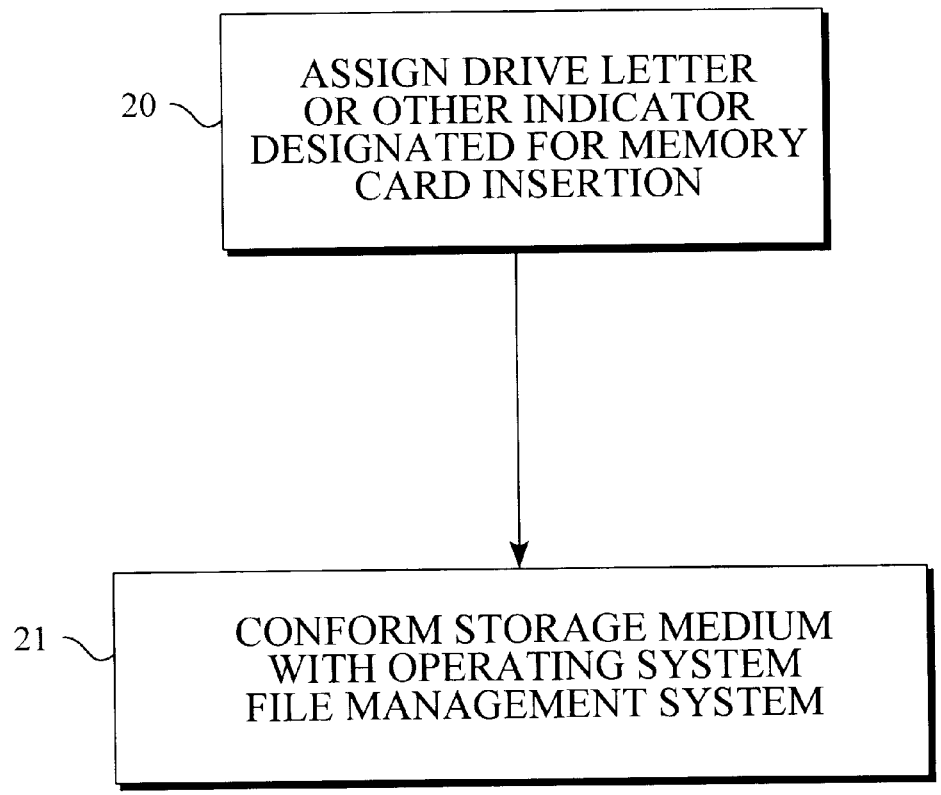
FIG. 2a is a flow chart of the method according to the present invention to create a virtual drive in connection with physically removable flash memory card.

FIG. 2*a* is a flow chart of the method according to the present invention to create a virtual drive in connection with physically removable flash memory card. According to the present invention, the virtual drive is assigned 20 a drive letter or other indicator corresponding to the location of flash memory card 18*d* to be inserted. Further, the flash storage medium of flash memory card 18*d* is conformed 21 with the operating system file management system which has been installed in PC system 18. This conformation is accomplished according to one embodiment of the present invention, by establishment of a flash translation layer 26 as described in more detail below. Conformation particularly means establishing tables and linkages between memory locations set by operating system 18*a* for storage of particular files, and the actual locations on a flash memory card on which the files will be stored. Such linkages, as will be seen, are accomplished through a virtual file allocation table. In this manner, operating system 18*a* is able to accomplish key storage in a flash memory card medium.

Figure 2B:
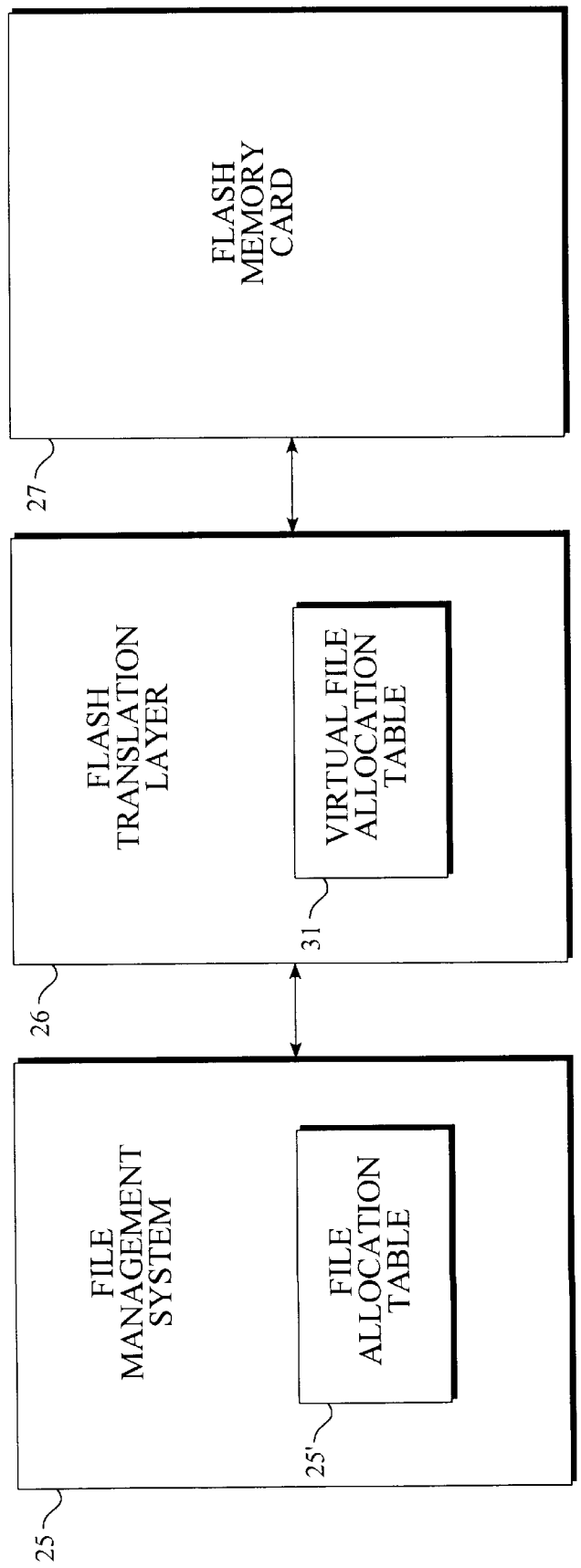
FIG. 2b is a block diagram showing the relationship between a PC operating system file management system and a flash medium in terms of a flash translation layer, using first and second file allocation tables respectfully held in the operating system of a file management system and in a flash translation layer.
Figure 26:
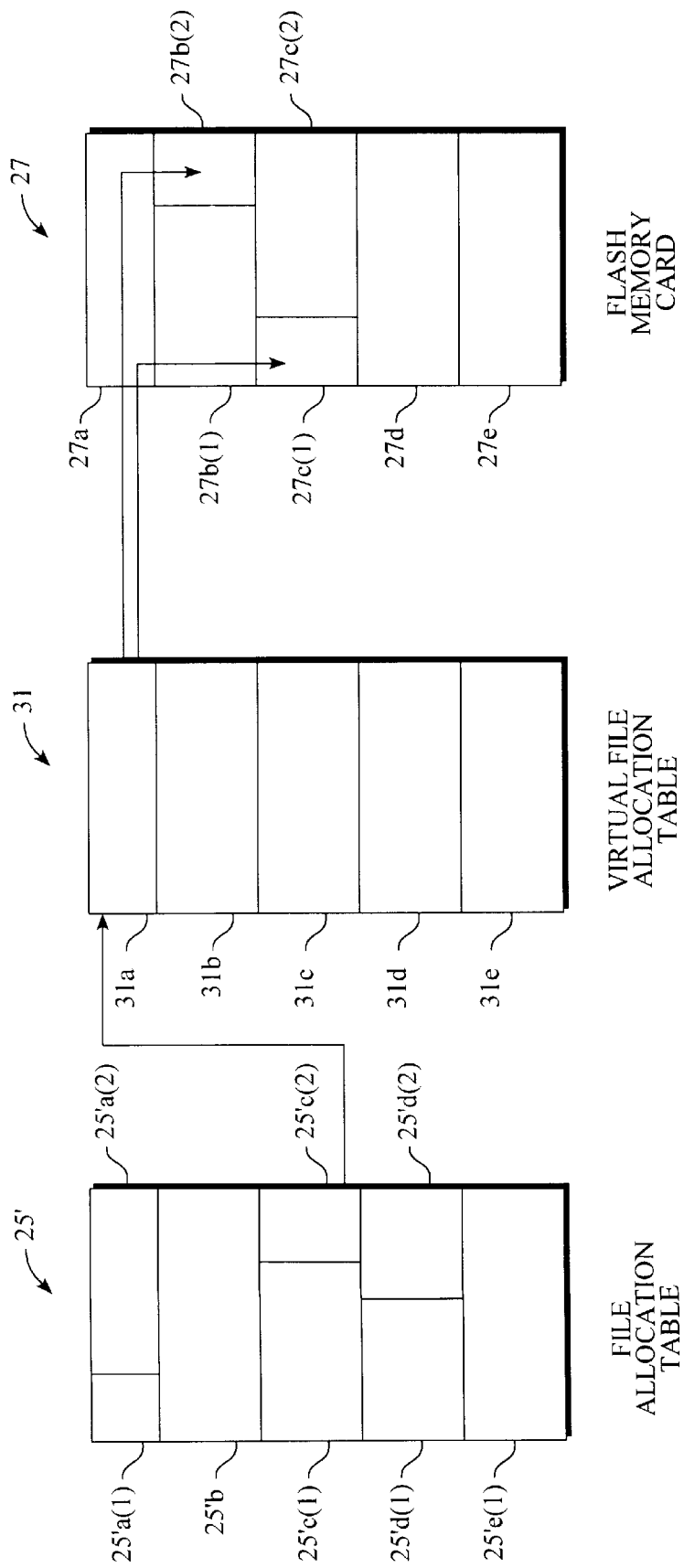

FIG. 2*b* is a block diagram showing the relationship between a PC operating system file management system 25 and a flash medium 27 in terms of a flash translation layer 26, using first and second file allocation tables 25' and 31, respectively held in the operating system of file management system 25 and in flash translation layer 26. A well-known flash translation layer is disclosed to interface between flash memory card erase blocks and the file system used by a PC operating system. This is described in U.S. Pat. No. 5,404,485 issued in 1995, which is hereby incorporated in its entirety by reference and made a part hereof. The FTL connects flash memory card 27 to file management system 25 used by operating system 18*a* of personal computing system 18.

FIG. 2*c* is a block diagram showing the relationship between a file allocation table 25' of operating system 18*a* and flash medium 27 in terms of a virtual file allocation table 31. By virtual, it is meant that the particular table has very short term viability compared to a non-virtual table, and is not stored on disk or card memory.

In operation, when the operating system reads or writes to or from flash memory medium 27, flash translation layer 26 translates the addresses of flash memory medium 27 to addresses used by the operating system file management system 25. Thus, a particular location, for example, 25'*c*(2), of file allocation table 25' contains a reference to a corresponding location, 31*a*, for example, in file allocation table 31, which in turn can refer to one or more locations, in this case, for example, locations 27*b*(2) and 27*c*(1), in flash memory medium 27. Thus, when the key generated is stored by operating system 18*a* on flash memory card 27, operating system 18*a* directs storage to a location in file allocation table 25', such as location 25'*c*(2). The actual storage will however be directed to the locations on flash memory card 27 which are established in virtual file allocation table 31, according to the reference linkage provided by file allocation table 25'. Thus, as per the former example, ultimate storage of the key would be to flash memory card locations 27*b*(2) and 27*c*(1).

Figure 3:
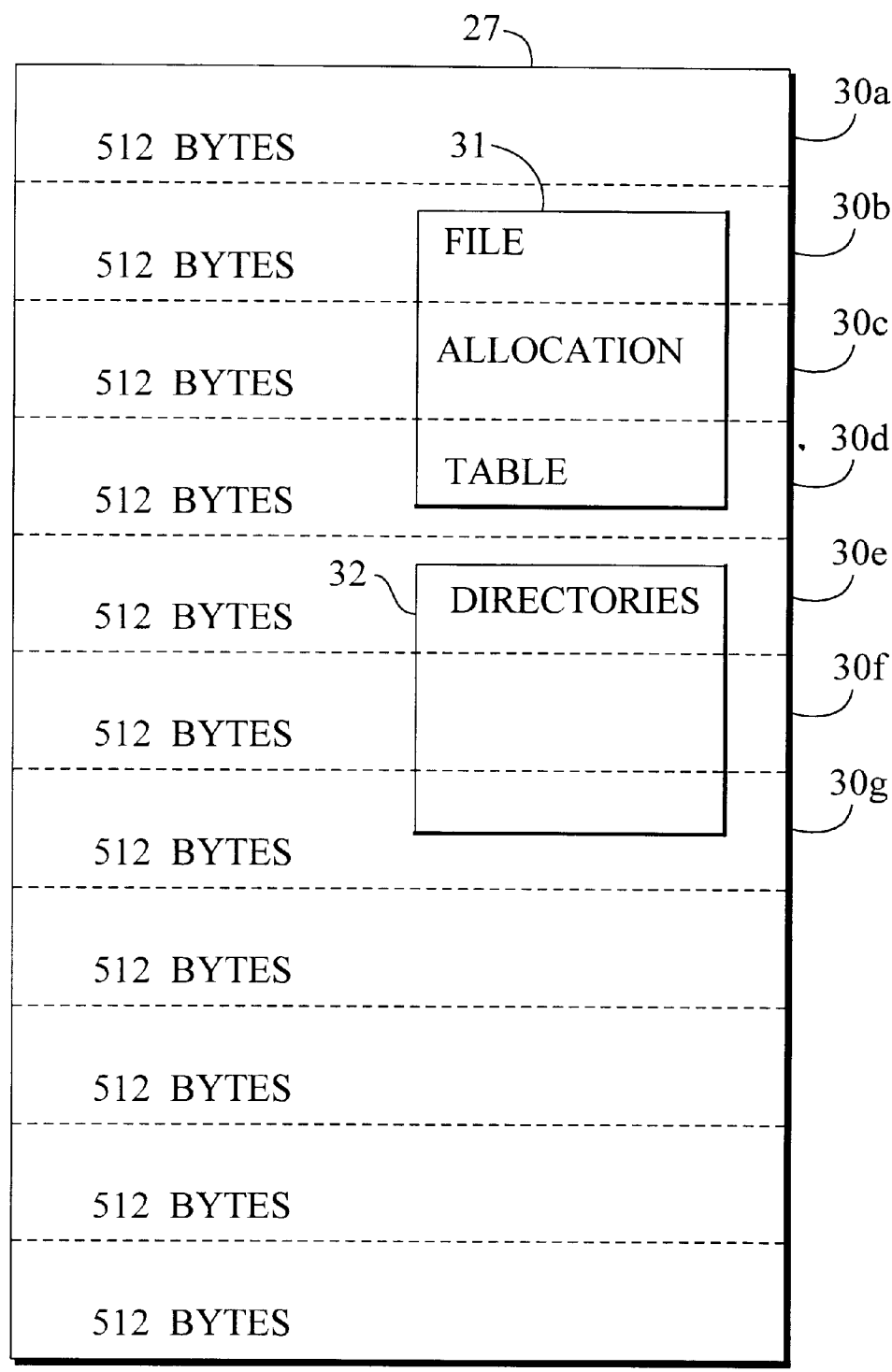
FIG. 3 is a diagram showing the virtual organization of a flash translation layer, according to the present invention.

FIG. 3 is a diagram showing an example of the virtual organization of a flash memory card 27 as represented to operating system through flash translation layer 26, according to the present invention. In particular, flash memory medium 27 is divided into 512 byte sectors or regions, in terms of its virtual representation. The physical condition of flash memory medium 27 remains unaltered. In its physical condition, flash memory medium 27 may be divided into 64KB, i.e., 64,000 byte, erase regions according to one embodiment. Other erase region sizes may, for example, be 4KB, 8KB, or 32KB According to the present invention, a flash optimized file system is employed, which allows the flash medium to resemble a mechanical drive (e.g., a hard or floppy drive) which possesses standard disk file structures such as a virtual file allocation table 31, directories 32, and 512 byte sectors 30*a*, 30*b* . . . 30*g*, etc. File directories 32 provide an organization of groups of files, as is well known in the art. Virtual file allocation table 31 provides a link between locations in flash memory card 27 and file allocation table 25', as discussed in detail above with reference to FIG. 2*c*.

What is claimed is:

1. A method for encryption of information using a computer, including:
   generating a key of a selected size,
   creating a virtual drive on a memory card,
   using the generated key to encrypt selected information,
   saving the generated key to a selected memory card,
   physically removing the memory card from the encrypted information, and
   remotely securing the memory card.

2. The method according to claim 1 wherein said key is generated by including selection of information bits transmitted with a noisy medium.

3. The method according to claim 2 wherein the selection of information bits transmitted with a noisy medium is accomplished at a random time.

4. The method according to claim 1 including measuring the size of the information to be encrypted.

5. A method for encryption of information using a computer, including:
   generating a key of a selected size,
   creating a virtual drive on a memory card,
   using the key generated to encrypt selected information,
   saving the key generated to a selected memory,
   creating a pointer that will read the virtual drive at the location on the memory card at which the key begins,
   physically removing the memory card from the encrypted information, and
   remotely securing the memory card.

6. A method for encryption of information using a computer, including:
    generating a key of a selected size,
    creating a virtual drive on a memory card,
    first using the generated key to encrypt selected information,
    next saving the generated key to a selected memory card,
    physically removing the memory card from the encrypted information, and
    remotely securing the memory card.

7. A system for encryption of selected information comprising:
    a computer system for communication with a flash memory card including a software storage medium;
    means for creating a virtual drive on said flash memory card;
    encryption software stored on said storage medium for encryption selected information, said encryption software generating an encryption key; and
    a system for storing a generated encryption key on said flash memory card.

* * * * *